(12) United States Patent
Nagler

(10) Patent No.: US 6,779,647 B1
(45) Date of Patent: Aug. 24, 2004

(54) METHOD FOR AUTOMATICALLY GROUPING ARTICLES

(75) Inventor: Peter Nagler, Fellbach (DE)

(73) Assignee: imt Robot AG, Fellbach (DE)

( * ) Notice: Subject to any disclaimer, the term of this patent is extended or adjusted under 35 U.S.C. 154(b) by 0 days.

(21) Appl. No.: 10/249,449

(22) Filed: Apr. 10, 2003

(30) Foreign Application Priority Data

Apr. 12, 2002 (DE) .......................................... 102 16 174

(51) Int. Cl.$^7$ .......................................... B65G 47/24
(52) U.S. Cl. ...................................................... 198/395
(58) Field of Search ................................ 198/395, 394

(56) References Cited

U.S. PATENT DOCUMENTS

| | | | | |
|---|---|---|---|---|
| 4,819,784 A | * | 4/1989 | Sticht ........................ | 198/395 |
| 5,057,055 A | * | 10/1991 | Michaud et al. .............. | 452/51 |
| 5,314,055 A | * | 5/1994 | Gordon ....................... | 198/395 |
| 5,370,216 A | * | 12/1994 | Tsuruyama et al. ......... | 198/395 |
| 5,687,831 A | * | 11/1997 | Carlisle ...................... | 198/395 |
| 5,845,759 A | * | 12/1998 | Takada et al. .............. | 198/399 |
| 6,315,103 B1 | * | 11/2001 | Bousherie ................... | 198/395 |
| 6,374,984 B1 | * | 4/2002 | Nagler ........................ | 198/382 |
| 6,502,688 B1 | * | 1/2003 | Krooss et al. .............. | 198/411 |
| 6,540,062 B2 | * | 4/2003 | Wunscher et al. .......... | 198/395 |

FOREIGN PATENT DOCUMENTS

| | | | | |
|---|---|---|---|---|
| JP | 1-220628 | * | 9/1989 | ................ 198/395 |
| WO | WO 92/03364 | * | 3/1992 | ................ 198/395 |

* cited by examiner

*Primary Examiner*—Douglas Hess
(74) *Attorney, Agent, or Firm*—Gudrun E. Huckett

(57) ABSTRACT

In a method for automatically grouping articles, the articles are moved on a belt to a manipulation device for grouping the articles in a predetermined order to form an assortment. Orientation and position of the articles on the belt are detected by a recognition device. A manipulation position based on the orientation and position detected by the recognition device, the belt speed, and the number of articles on the belt leading and/or trailing each article is determined for each article. The manipulation position is an assigned position in the assortment or an advanced or pushed-back position in the feeding direction. The advanced position or the pushed-back position is assigned when the number of articles leading and/or trailing each article is smaller than the predetermined number of the assortment. The manipulation device moves the articles into the manipulation position as soon as the articles reach its gripping range.

11 Claims, 2 Drawing Sheets

METHOD FOR AUTOMATICALLY GROUPING ARTICLES

BACKGROUND OF INVENTION

1. Field of the Invention

The invention relates to a method for automatically grouping articles placed on a feeding belt and transported on the feeding belt to a manipulation device where the articles are grouped in a predetermined order to form an assortment of a predetermined number of articles, wherein a recognition device detects the position and orientation of the arriving articles on the feeding belt and sends this information to a control unit which, taking into account the speed of the feeding belt, assigns to each article a placement position and controls the manipulation device accordingly as soon as this article reaches the gripping range of the manipulation device.

2. Description of the Related Art

U.S. Pat. No. 6,374,984 describes a method in which the articles are placed in random order onto the feeding belt, wherein a recognition device detects the orientation and position of the arriving articles and sends this information to a control unit. The control unit evaluates the random order on the feeding belt and determines the position of an assortment, comprised of several articles, on the feeding belt. Taking into consideration the belt speed of the feeding belt, the manipulation device is controlled by the control unit and the articles are moved by the manipulation device into the determined end position on the feeding belt.

The conveying flow of the articles on the feeding belt cannot always be maintained, and interruptions of the supply occur frequently in the known method. When the articles are placed in batches of great numbers onto the feeding belt, the automated manipulation device can group the articles at a high placement speed onto the feeding belt as long as the recognition device signals a sufficient number of articles within a gripping range (range of accessability) of the manipulation device. Before the next batch is placed onto the belt, articles may be temporarily present in reduced numbers on the conveying path of the feeding belt. The last articles of a batch can be positioned occasionally at such unfavorable locations, that grouping to an assortment would require high expenditure. Also, the remaining articles of a batch may no longer match the predetermined number of an assortment. These articles are then no longer correlated with an assortment but are removed from the feeding belt as rejects. Accordingly, each batch in the known method generates more or less reject material because of the articles remaining at the end of the batch sorting process.

SUMMARY OF INVENTION

It is an object of the present invention to provide a method for the automatic grouping of articles of the aforementioned kind which prevents rejects while enabling a reliable combining action to form the assortments and which makes possible a high sorting output.

In accordance with the present invention, this is achieved in that the control unit, when determining the placement position of an article, considers the number of articles on the feeding belt leading and/or trailing this article and, when a number of articles that is smaller than the number required for the assortment is detected, the manipulation devices places the article onto the feeding belt in an advanced position or pushed-back position relative to the conveying direction of the feeding belt.

According to the invention, when determining the placement or manipulation position of each article, the number of articles which are trailing this article on the feeding belt is to be considered and, when the number of articles is determined to be smaller than the number required for the assortment, the manipulation device is controlled and operated in a different mode. A gripped article is then not added to an assortment in the grouping mode of the manipulation device, but is placed in an advanced position or a pushed-back position onto the feeding belt relative to the conveying direction of the feeding belt. In this way, in this backing-up mode, the articles on the feeding belt are pushed back or advanced and only thereafter grouped to form an assortment. This backing-up operation is carried out based on predetermined criteria until the desired number of articles can be combined on the feeding belt.

The invention resides in the basic idea that, for a continuously running feeding belt, the articles are to be grouped within a certain unit of time, for example, the articles are to be grouped in accordance with a predetermined sorting pattern or the articles must be placed into receptacles or the like on the belt. The available excess sorting output when articles are missing can be used for the "backing-up mode" wherein the articles are advanced or are pushed back to trailing placement positions on the feeding belt until a sufficiently large number of articles is present in order to fulfill within the available time frame, as a function of the belt speed, the predetermined sorting rule. In this connection, hygiene criteria can also be taken into consideration, for example. With the method according to the invention, complete assortments are compiled wherein rejects are substantially eliminated.

In particular, it is possible to advance or to push back an article in a relay-type operation by means of a manipulation device comprised of several grippers. In this way, it is possible to cover distances which are a multiple of the gripping range of a robot arm. When the manipulation device has several grippers, the actions of the grippers can be controlled by the control unit in a coordinated fashion. When several article types are sorted or when one article type is embodied as a support, receptacle or the like for the assortment into which other articles are to be placed, each identical article is correlated advantageously with a designated gripper. However, it may also be expedient to control during the backing-up mode a selection of or only a single one of the grippers that are available in order to move all articles on the feeding belt into an advanced or pushed-back placement position. In particular, several grippers can be operated in the gripping mode while, simultaneously, other grippers can be operated in the backing-up mode.

DETAILED DESCRIPTION

Figure 1:
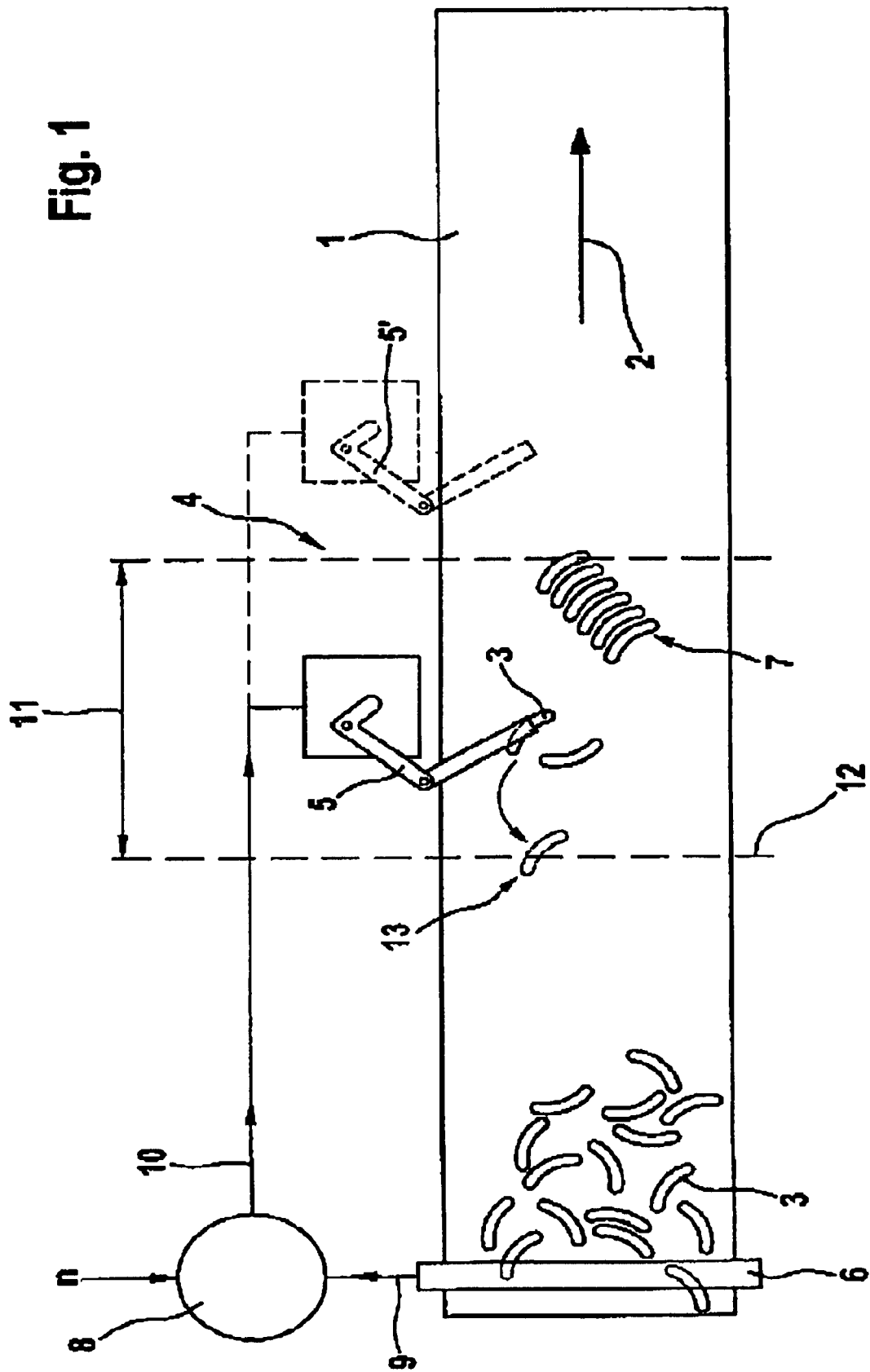
FIG. 1 is a plan view of a feeding belt on which articles are combined to in assortments by means of a manipulation device.
Figure 2:
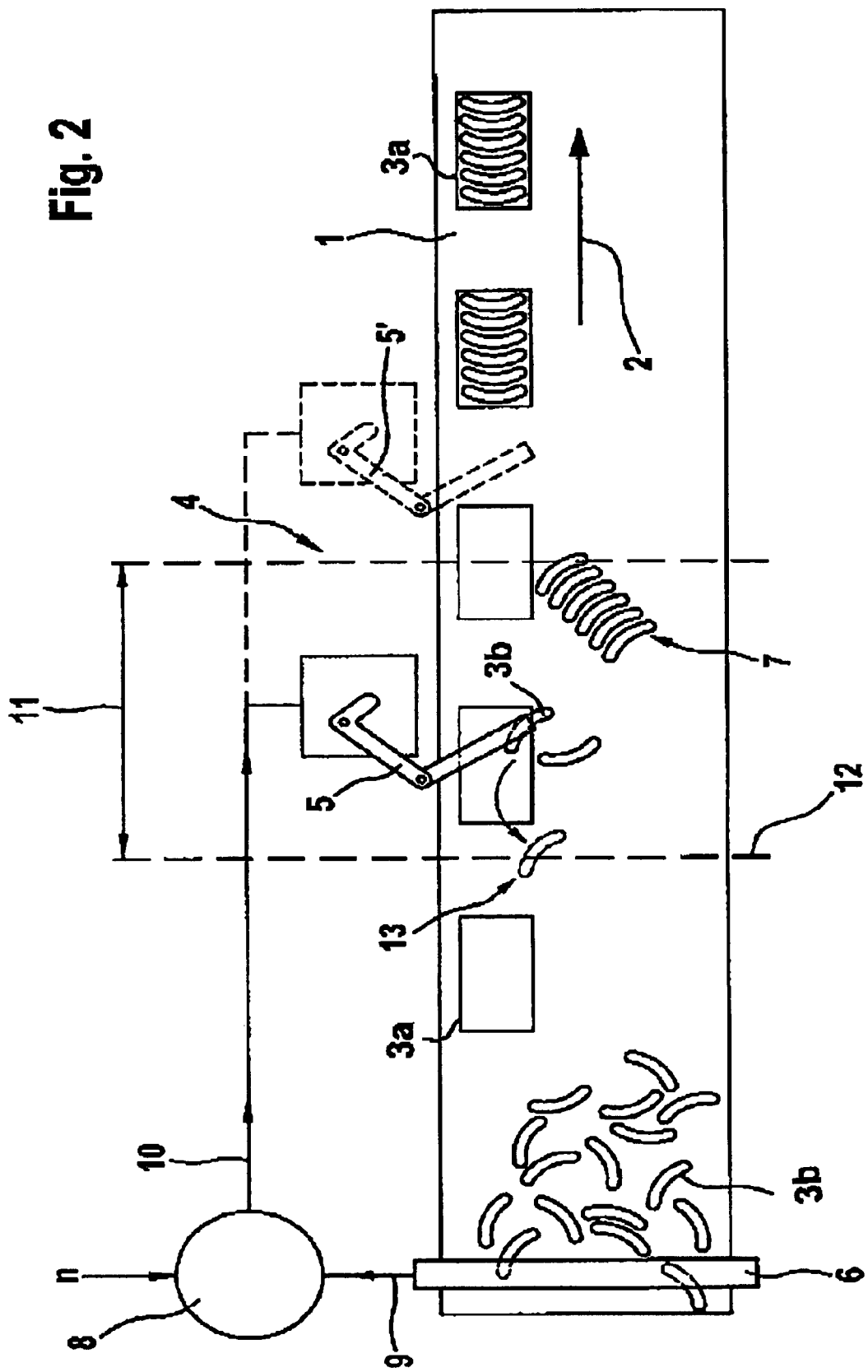
FIG. 2 shows containers as first articles receiving assortments of second articles sorted by the manipulation device.

The drawing FIG. 1 shows a feeding belt 1 on which articles, sausages 3 in the illustrated embodiment, are combined by a manipulation device 4 to assortments 7. The sausages 3, after their manufacture and a separation process subsequent thereto for separating the connected sausages, are placed in random order in batches onto the feeding belt 1 and are transported in the conveying direction 2 of the feeding belt 1 to the manipulation device 4. The manipulation device 4 can have several grippers 5, 5' of which only one is illustrated in solid lines. The sausages 3 are combined by the grippers 5 to assortments 7 of six adjacently positioned sausages wherein it is understood that the number of articles to be combined to an assortment 7 can vary. Moreover, other types of loose articles can be sorted or different articles placed onto the feeding belt can be sorted, wherein the manipulation device combines the articles to assortments with predetermined numbers of different article types. In this connection, one type of article of the articles 3 arriving on the feeding belt can be a support, container, receptacle or the like (3a) for an assortment 7, wherein other articles 3b combined to an assortment 7 are assigned to the support 3a etc. and are placed by the grippers 5 and 5' into the container or support 3a (FIG. 2). The assortments 7 on the supports or containers 3a are conveyed farther by the feeding belt 1 to an insertion device (not illustrated) for insertion into a packaging.

The manipulation device 4 is controlled by a control unit 8 which determines the control signal 10 for the gripper 5, embodied as a robot, based on the position signal 9 of a recognition device 6 by taking into consideration the belt speed n of the feeding belt 1. The recognition device 6 in the illustrated embodiment is an optical recognition device, for example, a CCD (charge coupled device) camera or the like which is designed to view the entire width of the feeding belt. The recognition device 6 detects across the width of the feeding belt the orientation and position of the sausages 3 passing through wherein the control device, based on the detected random order, calculates a virtual pattern of the assortment 7 on the feeding belt 1 and, in this connection, assigns a placement position (manipulation position) to each sausage in one of the assortments 7. Taking into consideration the speed n of the belt, which can be lower than the movement speed of a gripper, a corresponding control command 10 is input to the control unit as soon as the sausage 3 to be manipulated reaches the gripping range or range of accessibility 11 of the robot gripper 5.

The grouping mode of the manipulation device 4 by which the arriving sausages are compiled to assortments, is maintained as long as a sufficient number of sausages can be sorted by the manipulation device within the time frame determined by the belt speed n. When determining the placement position (manipulation position) for the individual sausages within the assortment, the control unit takes into consideration the number of the trailing sausages on the feeding belt and switches to a backing-up mode when the number of sausages on the feeding belt is smaller than the number required for an assortment. Individually supplied sausages, for example, sausages that are positioned on the feeding belt at a great distance from one another, or the remainder of a batch of sausages whose total number is no longer sufficient for forming a complete assortment 7, cannot be combined in the backing-up mode to assortments and are therefore moved to a pushed-back placement position 13 on the feeding belt 1 relative to the conveying direction 2. The placement position 13 can be selected at the point 12 of the accessible gripping range 11 positioned farthest to the front in the conveying direction 2. The placement position 13 is determined in the backing-up mode such that individually supplied sausages 3 are backed up until the recognition device detects the supply of additional sausages 3 of a new batch placed onto the feeding belt 1 and the control unit 8 subsequently switches into the grouping mode for sorting assortments 7. During the grouping mode, the gripper 5 can also transfer a sausage 3 to the gripper 5' so that a sausage 3 can also be advanced in the conveying direction 2.

The control according to the invention of the robot in a backing-up mode for concentrating or for advancing the articles to be sorted on the feeding belt 1 can be affected by inputting corresponding concentration values of the articles 3 wherein the concentration of the new batch of articles placed onto the feeding belt and passing through the recognition device 6 is detected by the recognition device and can be used as a parameter for switching between the grouping mode or insertion mode and the backing-up mode.

While specific embodiments of the invention have been shown and described in detail to illustrate the inventive principles, it will be understood that the invention may be embodied otherwise without departing from such principles.

What is claimed is:

1. A method for automatically grouping articles, the method comprising the steps of:

a) positioning articles on a feeding belt and transporting the articles on the feeding belt to a manipulation device for grouping the articles in a predetermined order to form an assortment of a predetermined number;

b) detecting orientation and position of the articles on the feeding belt by a recognition device;

c) determining for each one of the articles a manipulation position based on the orientation and position detected by the recognition device, a speed of the feeding belt, and number of articles on the feeding belt leading and/or trailing each one of the articles, wherein the manipulation position is an assigned position in the assortment or one of an advanced position or a pushed-back position in a conveying direction of the feeding belt, wherein the advanced position or the pushed-back position are assigned when the number of articles leading and/or trailing each one of the articles is smaller than the predetermined number required for the assortment;

d) controlling the manipulation device based on the manipulation position of step c) as soon as the articles reach a gripping range of the manipulation device and moving the articles into the manipulation position.

2. The method according to claim 1, comprising the step of operating the manipulation device in a backing-up mode, wherein the articles are placed into the pushed-back position onto the feeding belt.

3. The method according to claim 2, wherein the manipulation device is operated in the backing-up mode until a sufficient number of the articles has been placed in the pushed-back position onto the feeding belt so that the number of articles leading and/or trailing each one of the articles is no longer smaller than the predetermined number required for the assortment, and cancelling the backing-up mode of the manipulation device.

4. The method according to claim 1, comprising the step of operating the manipulation device in a grouping mode for placing the articles according to the assigned position in the assortment onto the feeding belt while placing simultaneously some of the articles according to the advanced position or pushed-back position onto the feeding belt.

5. The method according to claim 1, further comprising the step of sorting the articles on the feeding belt.

6. The method according to claim 1, wherein the assortments are comprised of different articles, respectively.

7. The method according to claim 6, wherein a first type of the articles arriving on the feeding belt is a carrier, support, container, or receptacle for the assortment, wherein a second type of the articles is assigned to the first type of the articles and inserted by the manipulation device into the first type of the articles.

8. The method according to claim 1, wherein the manipulation device comprises several grippers controlled in a correlated fashion relative to one another.

9. The method according to claim 8, wherein the grippers move the articles in a relay fashion into the advanced position or pushed-back position.

10. The method according to claim 8, wherein the articles that are identical have a designated one of the grippers.

11. The method according to claim 8, comprising the step of operating the manipulation device in a backing-up mode, wherein the articles are placed into the pushed-back position onto the feeding belt, wherein during the backing-up mode only some of the grippers operate according to the backing-up mode while remaining ones of the grippers continue to place the articles in the assigned position onto the feeding belt.

* * * * *